United States Patent
Chen et al.

(10) Patent No.: US 6,641,936 B1
(45) Date of Patent: Nov. 4, 2003

(54) MAGNETIC MEDIA WITH HIGH CR CONTENT, NON-MAGNETIC COCRPT INTERMEDIATE LAYERS

(75) Inventors: Qixu Chen, Milpitas, CA (US); Shanghsien Rou, Fremont, CA (US); Samuel D. Harkness, IV, San Francisco, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 30 days.

(21) Appl. No.: 10/020,847

(22) Filed: Dec. 18, 2001

Related U.S. Application Data (60) Provisional application No. 60/279,357, filed on Mar. 27, 2001.

(51) Int. Cl.$^7$ .............. G11B 5/66; G11B 5/70; B05D 5/12; C23C 14/34; C25D 5/10
(52) U.S. Cl. .............. 428/694 TS; 428/336; 428/611; 428/667; 428/900; 427/128; 427/131; 204/192.2
(58) Field of Search .............. 428/694 TS, 336, 428/611, 667, 900; 427/128, 131; 204/192.2

(56) References Cited

U.S. PATENT DOCUMENTS

| 5,736,262 | A |   | 4/1998  | Ohkijima et al.  | 428/611   |
|-----------|---|---|---------|------------------|-----------|
| 5,922,442 | A |   | 7/1999  | Lal et al.       | 428/216   |
| 6,001,447 | A |   | 12/1999 | Tanahashi et al. | 428/65.3  |
| 6,010,795 | A |   | 1/2000  | Chen et al.      | 428/611   |
| 6,132,863 | A |   | 10/2000 | Song et al.      |           |
| 6,143,388 | A | * | 11/2000 | Bian et al.      | 428/65.3  |
| 6,150,016 | A |   | 11/2000 | Song et al.      | 428/332   |
| 6,221,481 | B1|   | 4/2001  | Wu et al.        | 428/332   |
| 6,242,086 | B1|   | 6/2001  | Song et al.      | 428/332   |
| 6,420,058 | B1| * | 7/2002  | Haratani et al.  | 428/694 T |

* cited by examiner

Primary Examiner—Holly Rickman
(74) Attorney, Agent, or Firm—McDermott, Will & Emery (57) ABSTRACT

A magnetic recording medium comprises, in overlying sequence from a surface of a non-magnetic substrate:
at least one Cr-containing or B2-structured underlayer;
a substantially non-magnetic CoCrPt alloy intermediate layer; and
at least one CoCrPtB ferromagnetic alloy recording layer;
wherein the intermediate layer of substantially non-magnetic CoCrPt alloy has a composition which facilitates Co (11.0) or (10.0) crystallographic orientation of the at least one CoCrPtB ferromagnetic alloy recording layer.

19 Claims, 5 Drawing Sheets

MAGNETIC MEDIA WITH HIGH CR CONTENT, NON-MAGNETIC COCRPT INTERMEDIATE LAYERS

CROSS-REFERENCE TO PROVISIONAL APPLICATION

This application claims priority from U.S. provisional patent application Serial No. 60/279,357 filed Mar. 27, 2001, the entire disclosure of which is incorporated herein by reference.

FIELD OF THE INVENTION

The present invention relates to an improved magnetic recording medium, such as a thin film magnetic recording disk, and to a method of manufacturing the medium. The invention has particular applicability to longitudinal magnetic recording media exhibiting high areal recording density, low noise, high SMNR, and high coercivity.

BACKGROUND OF THE INVENTION

The continuously increasing requirements for thin film magnetic recording media with very high areal recording densities impose increasingly greater requirements on the magnetic properties of the various thin film layers constituting the media, such as increased remanent magnetic coercivity ($H_r$), and coercivity squareness ($S_r$*), low medium noise, e.g., expressed as signal-to-medium noise ratio (SMNR), and improved narrow track recording performance. As the areal recording density requirement increases, it becomes increasingly difficult to fabricate magnetic recording media, e.g., thin film longitudinal media, which satisfy each of these demanding requirements.

The linear recording density can be increased by increasing the $H_r$ of the media; however, this objective can only be achieved by decreasing the media noise, as by formation and maintenance of magnetic recording layers with very finely dimensioned, non-magnetically coupled grains. Media noise is a dominant factor restricting obtainment of further increases in areal recording density of high density magnetic hard disk drives. The problem, or cause, of media noise is generally attributed, in large part, to inhomogeneous magnetic grain size and inter-granular exchange coupling. Accordingly, it is considered that, in order to increase linear recording density of thin film magnetic media, the media noise must be minimized by suitable control of the microstructure of the magnetic recording layer(s).

Figure 1:
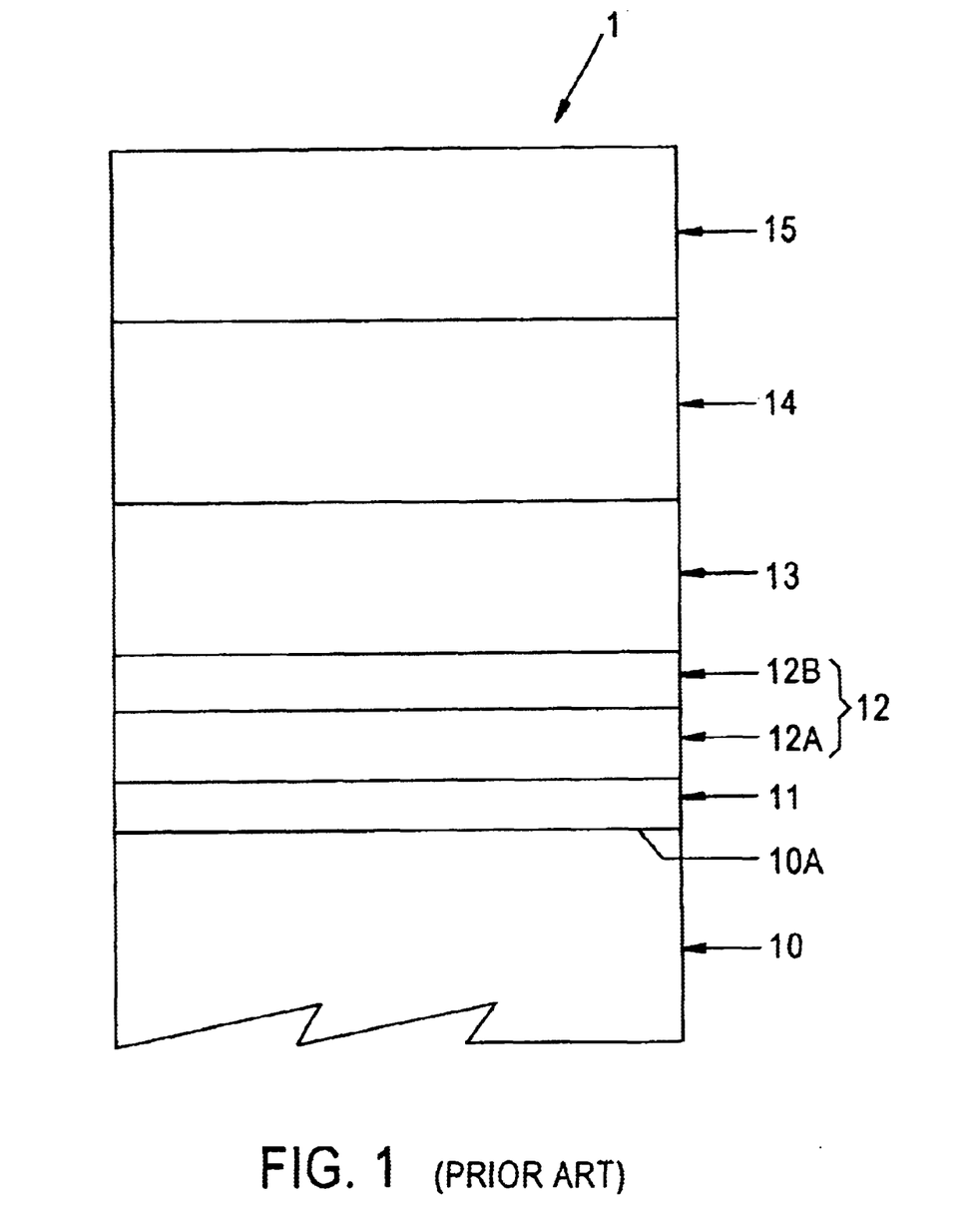
FIG. 1 schematically illustrates, in simplified, cross-sectional view, a portion of a conventional longitudinal magnetic recording medium.

A portion of a conventional thin film, longitudinal magnetic recording medium 1, such as is commonly employed in hard disk form in computer-related applications, is depicted in FIG. 1 in simplified, schematic cross-sectional view, and comprises a substantially rigid, non-magnetic substrate 10, typically of aluminum (Al) or an aluminum-based alloy, such as an aluminum-magnesium (Al—Mg) alloy, or of glass, glass-ceramic, etc., having sequentially deposited or otherwise formed on a surface 10A thereof a plurality of thin film layers. When substrate 10 comprises Al or an Al-based alloy a plating layer 11, such as of amorphous nickel-phosphorus (Ni—P), is typically initially provided on substrate surface 10A (such NiP plating layer 11 generally is omitted when substrate 10 comprises glass). The plurality of thin film layers formed over plating layer 11 or substrate surface 10A include a system 12 of layers for control of the microstructure of medium 1, comprising a first, or seed layer 12A of an amorphous or fine-grained material, e.g., a chromium-titanium (Cr—Ti) alloy and a second, polycrystalline underlayer 12B, typically of Cr, a Cr-based alloy, or a B2-structured Ni—Al alloy (as first described by Li-Lien Lee et al. in IEEE *Transactions on Magnetics*, 30 (6), 3951–3953 (1994)); a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

As indicated above, it is recognized that the magnetic properties which are critical to the performance of the magnetic recording. layer 13, i.e., $H_r$, $M_r$ (magnetic remanence), S*, and SMNR, depend primarily on the microstructure of the magnetic recording layer 13 which, in turn, is strongly influenced by the microstructure of the underlying system 12 of seed and underlayers 12A and 12B, respectively. It is also recognized that underlayers having a very fine grain structure are highly desirable, particularly for growing fine grains of hexagonal close-packed (hcp) Co-based magnetic alloys deposited thereon.

Figure 2:
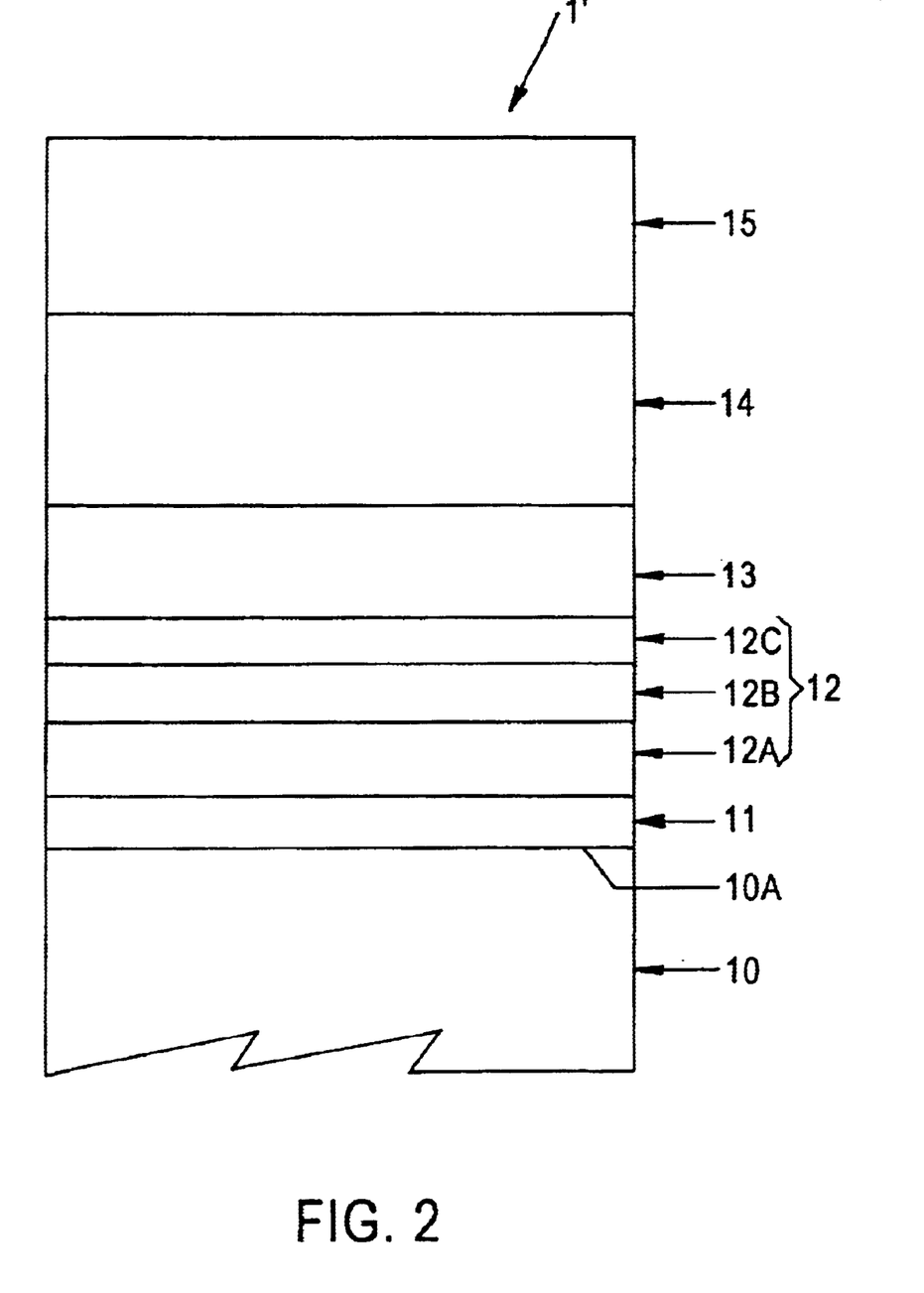
FIG. 2 schematically illustrates, in simplified, cross-sectional view, a portion of the longitudinal magnetic recording medium of FIG. 1 modified to include an intermediate layer below the active magnetic recording layer.

Adverting to FIG. 2, a recent approach for improving the microstructure, texture, and crystallographic orientation of magnetic alloys in the fabrication of thin film, high recording density, longitudinal magnetic recording media 1', involves modification of layer system 12 for microstructure control to include a third, intermediate (or "onset") layer 12C between underlayer 12B and magnetic recording layer 13. A number of Co-based alloy materials, such as CoCr, magnetic CoPtCr, CoPtCrTa, CoCrB, CoCrTa, and CoCr-TaO$_x$ (where O$_x$ indicates surface-oxidized CoCrTa), etc., have been studied for use as intermediate layers 12C according to such approach, as disclosed in, for example, U.S. Pat. Nos. 5,736,262; 5,922,442; 6,001,447; 6,010,795; 6,143,388; 6,150,016; 6,221,481 B1; and 6,242,086 B1, the entire disclosures of which are incorporated herein by reference.

Currently, the most widely utilized magnetic alloy for the active recording layer of thin film, high areal recording density, longitudinal media is high Pt, high B content CoCrPtB, i.e., with more than about 5 at. % each of Pt and B. However, the use of such high Pt, high B content CoCrPtB magnetic alloys presents several difficulties and drawbacks with respect to the design of high areal density, high SMNR media having a film structure similar to that of FIG. 2 including a layer system 12 for microstructure control, comprised of one or more of seed layer 12A, underlayer 12B, and intermediate layer 12C.

Specifically, as disclosed in commonly assigned U.S. Pat. No. 6,132,863 and U.S. patent application Ser. No. 09/497, 524, filed Feb. 4, 2000, the entire disclosures of which are incorporated herein by reference, magnetic media can be advantageously fabricated with simultaneous crystallographic orientation and grain size refinement, by interposition of a "double underlayer" structure (equivalent to a structure represented as $12B_1/12B_2$, wherein $12B_1$ and $12B_2$ respectively indicate first-deposited and second-deposited underlayers) between the substrate and the magnetic recording layer, e.g., a Cr/CrV or Cr/CrW double underlayer structure, with the Cr first underlayer (=$12B_1$) being deposited directly on the substrate. Such media with a Cr first underlayer deposited directly on the substrate or via an intervening seed layer (=12A) exhibit high SMNR. However, the lattice mismatch between the Cr first underlayers and the high Pt, high B CoCrPtB magnetic recording layer is very large. In addition, since the typically utilized NiAl-based, B-2 structured underlayer 12B has lattice constants similar to that of the Cr underlayers 12B or $12B_1$, the difference in lattice constants between the NiAl-based underlayer 12B and the CoCrPtB recording layer(s) 13 is similarly large. More particularly, for good lattice matching, the (110) planes of Cr and NiAl should match with the (00.2) planes of Co. Therefore, the $2d$ values of these planes must be compared, where d is the spacing between planes. Specifically, the $2d$ values of the (110) plane of each of Cr and NiAl is 4.07 Å, whereas the $2d$ values of representative Co (00.2) planes of high Pt, high B content CoCrPtB magnetic alloys $CoCr_{16}Pt_{10}B_{10}$ and $CoCr_{22}Pt_{12}B_6$ are 4.189 and 4.193 Å, respectively (wherein the subscripts in each case indicate atomic percent).

In addition to the above disadvantage associated with the use of high Pt, high B content CoCrPtB magnetic alloys with the enumerated seed and underlayer materials, the CoCrTa-based alloys typically utilized as an intermediate layer (12C) between the seed/underlayer system (12A/12B) and the recording layer 13 are not suitable for use with the currently utilized CoCrPtB alloys in most instances. The difficulty arises from the tendency for high Cr content CoCrTa alloys, e.g., $CoCr_{37}Ta_8$, to promote undesirable Co (00.2) crystallographic texture in the CoCrPtB magnetic recording layer (13). Moreover, the use of CoCrTa alloys with lower Cr content, such as $CoCr_{14}Ta_4$, is problematic in that they have a much lower magnetic anisotropy than CoCrPtB, and as a consequence, the coercivity of the combined intermediate layer/magnetic layer (=12C/13) is not significantly enhanced. Also, the extremely small grain size of CoCrTa-based intermediate layers renders them susceptible to undesirable polarity reversal under very low magnetic fields.

In view of the foregoing, there exists a need for improved thin film intermediate layers and materials, as well as improved methods for their use in forming thin film, very high areal recording density, longitudinal magnetic recording media exhibiting high SMNR and utilizing CoCrPtB magnetic alloy materials for the active recording layer. Specifically, there exists a need for improved methods which can be readily and easily implemented for interposing an improved intermediate layer in thin film form between Cr-containing or B2-structured underlayers and high Pt, high B content CoCrPtB magnetic alloy recording layers, in order to maintain good Co (11.0) or (10.0) crystallographic orientation of the latter, with attendant good magnetic recording performance at high SMNR.

The present invention, therefore, addresses and solves problems attendant upon forming thin film, high areal recording density, high SMNR, longitudinal magnetic recording media including high Pt, high B content CoCrPtB alloy recording layers and Cr-based or B2-structured underlayers, e.g., in the form of hard disks, which media utilize substantially non-magnetic, high Cr content CoCrPt intermediate layers for promoting and maintaining Co (11.0) or (10.0) crystallographic orientation of the CoCrPtB alloy recording layers, while affording full capability with all technical and economic aspects of conventional automated manufacturing technology for the fabrication of magnetic recording media.

DISCLOSURE OF THE INVENTION

An advantage of the present invention is an improved, low noise, high areal recording density, longitudinal magnetic recording medium.

Another advantage of the present invention is a method of manufacturing an improved low noise, high areal recording density, longitudinal magnetic recording medium.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a magnetic recording medium, comprising in overlying sequence from a surface of a non-magnetic substrate:

at least one Cr-containing or B2-structured underlayer;

a substantially non-magnetic CoCrPt alloy intermediate layer; and at least one CoCrPtB ferromagnetic alloy recording layer; wherein the intermediate layer of substantially non-magnetic CoCrPt alloy has a composition which facilitates Co (11.0) or (10.0) crystallographic orientation of the at least one CoCrPtB ferromagnetic alloy recording layer.

According to embodiments of the present invention, the at least one CoCrPtB ferromagnetic alloy recording layer contains at least about 5 at. % each of Pt and B and the intermediate layer of substantially non-magnetic CoCrPt alloy has a lattice constant which reduces the effect of lattice constant mismatch between the at least one Cr-containing or B2-structured underlayer and the at least one CoCrPtB ferromagnetic alloy recording layer; the intermediate layer of substantially non-magnetic CoCrPt alloy has a thickness from about 10 to about 45 Å, and contains from about 28 to about 43 at. % Cr and from about 4 to about 15 at. % Pt.

In accordance with certain exemplary embodiments of the present invention, the intermediate layer of substantially non-magnetic CoCrPt alloy is $CoCr_{37}Pt_5$ or $CoCr_{30}Pt_9$.

According to further embodiments of the present invention, the medium is a bi-crystal or uni-crystal medium and further comprises a seed layer intermediate the non-magnetic substrate and the at least one Cr-containing or B2-structured underlayer, the at least one seed layer being selected from the group consisting of Cr/NiPO$_x$, CrTi, and NiAlO$_x$.

According to certain embodiments of the present invention, the at least one Cr-containing or B2-structured underlayer is selected from the group consisting of: Cr, CrW, CrMo, and CrV (each body-centered cubic, i.e., "BCC"); NiAl, NiAlTi, and NiAlRu (each B2-structured); and double-layer structures such as Cr/CrW, Cr/CrV, and NiAl/CrMo.

According to other embodiments of the present invention, the magnetic recording medium further comprises a protective overcoat layer over the ferromagnetic recording layer and a lubricant topcoat over the protective overcoat layer.

Another aspect of the present invention is a method of manufacturing a magnetic recording medium, which method comprises the sequential steps of:

(a) providing a non-magnetic substrate having a surface;

(b) forming at least one Cr-containing or B2-structured underlayer on the substrate surface;

(c) forming a substantially non-magnetic CoCrPt alloy intermediate layer over the at least one Cr-containing or B2-structured underlayer; and (d) forming at least one CoCrPtB ferromagnetic alloy recording layer over the substantially non-magnetic CoCrPt alloy intermediate layer;

wherein step (c) comprises forming the intermediate layer of substantially non-magnetic CoCrPt alloy with a composition which facilitates Co (1 1.0) or (10.0) crystallographic orientation of the at least one CoCrPtB ferromagnetic alloy recording layer.

In accordance with various embodiments of the present invention, step (a) comprises providing a non-magnetic substrate selected from the group consisting of Al, Al—Mg alloys, other Al-based alloys, NiP-plated Al, NiP-plated Al-based alloys, glass, ceramics, glass-ceramics, polymers, and laminates or composites thereof; step (b) comprises forming the at least one Cr-containing or B2-structured underlayer from the group consisting of Cr, CrW, CrMo, CrV, Cr/CrV, Cr/CrW, NiAl, NiAlTi, NiAlRu, and NiAl/CrMo; step (c) comprises forming an about 10 to about 45 Å thick, substantially non-magnetic CoCrPt alloy intermediate layer containing from about 28 to about 43 at. % Cr and from about 4 to about 15 at. % of Pt, the intermediate layer of substantially non-magnetic CoCrPt alloy having a lattice constant which reduces the effect of lattice constant mismatch between the at least one Cr-containing or B2-structured underlayer and the at least one CoCrPtB ferromagnetic alloy recording layer; and step (d) comprises forming at least one CoCrPtB ferromagnetic alloy recording layer containing at least about 5 at. % each of Pt and B.

According to certain embodiments of the present invention, the method further comprises a step of forming a seed layer on the non-magnetic substrate prior to performing step (b) for forming the at least one Cr-containing or B2-structured underlayer, the at least one seed layer being selected from the group consisting of Cr/NiPO$_x$, CrTi, and NiAlO$_x$.

In accordance with further embodiments of the present invention, the method further comprises the sequential steps of:

(e) forming a protective overcoat layer over the ferromagnetic recording layer; and (f) forming a lubricant topcoat over the protective overcoat layer.

Embodiments of the present invention include performing at least depositing steps (b)–(d) by sputtering.

Still another aspect of the present invention is a magnetic recording medium, comprising:

at least one Cr-based or B2-structured underlayer and at least one CoCrPtB ferromagnetic recording layer containing at least about 5 at. % each of Pt and B; and means for facilitating Co (11.0) or (10.0) crystallographic orientation of the at least one CoCrPtB ferromagnetic alloy recording layer.

In accordance with embodiments of the present invention, the medium further comprises a non-magnetic substrate for supporting the underlayer, ferromagnetic recording layer, and the means for facilitating.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

The present invention is based upon recognition that high areal density, thin-film magnetic recording media, i.e., longitudinal media, having well-developed Co (11.0) or (10.0) crystallographic orientations of a high Pt, high B content, CoCrPtB-based active magnetic recording layer, along with high coercivity and high SMNR, can be reliably and readily fabricated by providing a substantially non-magnetic, high Cr content, CoCrPt intermediate layer between a Cr-based or B2-structured underlayer and the CoCrPtB active ferromagnetic recording layer. According to the invention, a substantially non-magnetic, high Cr content CoCrPt intermediate layer, i.e., with from about 28–43 at. % Cr, has optimal crystallographic texture and, when interposed between the ferromagnetic recording layer and the Cr-based or B2-structured (e.g., NiAl-based) underlayer, reduces the lattice mismatch between both B2-structured (e.g., NiAl-based) and Cr-based underlayers and the CoCrPtB ferromagnetic recording layer. The high level of Cr addition to the Co-alloy based intermediate layer reduces the density of stacking faults therein and the CoCrPt intermediate layer enhances epitaxial growth of the CoCrPtB ferromagnetic layer on the Cr-based or B2-structured underlayer. In addition, exchange coupling between adjacent magnetic grains is reduced via diffusion of Cr from the intermediate layer to the grain boundaries of the CoCrPtB ferromagnetic film, thereby reducing media noise. Lastly, the non-magnetic nature of the high Cr content CoCrPt intermediate layers ensures that no complicating effects are introduced into the magnetic recording process.

According to the invention, the substantially non-magnetic, high Cr content, CoCrPt intermediate layers can be formed on Cr-based or B2-structured underlayers formed directly on substrate surfaces, e.g., Al-based substrates, or on glass-based substrates for uni-crystal or bi-crystal media, wherein a seed layer is present between the underlayer and the substrate.

The inventive methodology affords several advantages not obtainable according to the conventional art, including, inter alia, stronger preferred Co (11.0) or (10.0) crystallographic orientations of the ferromagnetic recording layer, increased remanent coercivity, increased squareness of the remanent coercivity, lower noise, and increased SMNR vis-a-vis high areal recording density, longitudinal magnetic media utilizing high Pt, high B content CoCrPtB ferromagnetic alloys and Cr-based or B2-structured underlayers without the inventive non-magnetic CoCrPt intermediate layers; and reliable, controllable, and cost-effective formation of stable, high SMNR, very high areal density magnetic recording media utilizing conventional manufacturing techniques and instrumentalities, e.g., sputtering techniques and apparatus.

FIG. 2 schematically illustrates, in simplified cross-sectional view, embodiments of magnetic recording media embodying the inventive concept. An embodiment of a magnetic recording medium 1' according to the invention includes a non-magnetic substrate 10 selected from among Al, Al-based alloys such as Al—Mg alloys, NiP-plated Al ("Al/NiP"), other metals and metal alloys, glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity. Substrate 10 typically comprises Al or an Al-based alloy, e.g., an Al—Mg alloy, or glass, and, as previously indicated, in the case of Al-based substrates includes on the surface 10A thereof a plating layer 11, e.g., an about 5 to about 20 $\mu$m thick layer of amorphous NiP. Formed on the plating layer 11 is a layer system 12, for controlling the crystallographic texture and properties of ferromagnetic Co-based alloy layers deposited thereover, which layer 12 can (particularly when substrate 10 is glass or glass-based) include first, second, and third portions 12A, 12B, and 12C, respectively, wherein the first, or lowermost portion 12A is a seed layer from about 40 to about 2,000 Å thick and comprised of an amorphous or fine-grained material, e.g., a CrTi alloy layer, a NiAlO$_x$ surface oxidized layer, or a Cr/NiPO$_x$ bi-layer structure; the second, or middle portion 12B is a Cr-based or B2-structured polycrystalline underlayer from about 40 to about 1,000 Å thick, typically of Cr or a Cr-based alloy, such as CrW, CrMo, and CrV (each BCC); NiAl, NiAlTi, and NiAlRu (each B2-structured); and double-layer structures such as Cr/CrW, Cr/CrV, and NiAl/CrMo. The third, or uppermost portion 12C according to the invention is an intermediate layer from about 10. to about 45 Å thick and having a composition which facilitates Co (11.0) or (10.0) crystallographic orientation of at least one overlying CoCrPtB-based ferromagnetic alloy recording layer 13, the intermediate layer 12C being composed of a substantially non-magnetic CoCrPt alloy containing from about 28 to about 43 at. % Cr and from about 4 to about 15 at. % Pt, e.g., CoCr$_{37}$Pt$_5$ or CoCr$_{30}$Pt$_9$.

According to the invention, recording layer 13 is composed of at least one layer of a CoCrPrB magnetic alloy containing at least about 5 at. % each of Pt and B, and the intermediate layer 12C of the above-described substantially non-magnetic CoCrPt alloy has a lattice constant which reduces the effect of lattice constant mismatch between the Cr-containing or B2-structured NiAl-based underlayer 12B and the at least one CoCrPtB ferromagnetic alloy recording layer 13.

As indicated above, interposition of the substantially non-magnetic, high Cr content CoCrPt intermediate layer 12C between the CoCrPtB ferromagnetic recording layer 13 and the Cr-based or B2-structured underlayer 12B provides a number of advantages over the prior art, including, inter alia:

(1) the high Cr content, substantially non-magnetic CoCrPt intermediate layer, i.e., with from about 28–43 at. % Cr, has optimal crystallographic texture and reduces the lattice mismatch between Cr-based and B2-structured, NiAl-based underlayers and the CoCrPtB ferromagnetic recording layer;

(2) the Cr addition to the Co-alloy intermediate layer reduces the density of stacking faults therein and the CoCrPt intermediate layer enhances epitaxial growth of the CoCrPtB ferromagnetic layer on the Cr-based or B2-structured underlayer;

(3) exchange coupling between adjacent magnetic grains of the CoCrPtB ferromagnetic recording layer is reduced via diffusion of Cr from the intermediate layer to the grain boundaries of the CoCrPtB ferromagnetic film, whereby media noise is reduced;

(4) the substantially non-magnetic character of the high Cr content CoCrPt intermediate layers ensures that no complicating effects are introduced into the magnetic recording process; and (5) the substantially non-magnetic, high Cr content, CoCrPt intermediate layers can be formed on Cr-based or B2-structured underlayers formed directly on substrate surfaces, e.g., Al-based substrates, or on glass-based substrates for uni-crystal or bi-crystal media, wherein a seed layer may be present between the underlayer and the substrate.

Referring still to FIG. 2, as with medium 1 of FIG. 1, medium 1' further includes a protective overcoat layer 14 from about 20 to about 100 Å thick, formed over magnetic recording layer 13, the protective overcoat layer 14 typically containing carbon (C), e.g., diamond-like carbon (DLC); and a lubricant topcoat layer 15 atop the protective overcoat layer 14, the lubricant topcoat layer being from about 10 to about 30 Å thick and typically comprised of a perfluoropolyether compound.

Each of the layers of the magnetic medium 1' according to the invention, including those of the inventive intermediate layer 12C, may be deposited or otherwise formed by any suitable physical vapor deposition technique (PVD), e.g., sputtering, or by a combination of PVD techniques, i.e., sputtering, vacuum evaporation, etc. Protective overcoat and lubricant topcoat layers 14 and 15, respectively, can be applied in conventional fashion, e.g., as by sputtering and dipping, respectively.

EXAMPLES

Each of the media samples described below, including those including high Cr content, substantially non-magnetic intermediate layers according to the invention and those fabricated for comparison purposes, was prepared by DC magnetron sputtering, utilizing a model MDP-250 sputter system (Intevac Inc., Santa Clara, CA). The sputter deposition parameters were not critical to the practice of the invention; therefore, the following deposition conditions for the seed layers, underlayers, intermediate layers, and magnetic recording layers are given by way of illustration only: alloy targets of composition corresponding to the desired film composition were sputtered in Ar at pressures in the range from about 5 to about 8 mTorr, target powers in the range from about 0.5 to about 4 kW, and deposition rates in the range from about 40 to about 50 Å/kW/sec. Seed layers, underlayers, intermediate layers, magnetic recording layers, and carbon-based protective overcoat layers were sequentially deposited on Al-based substrates; whereas glass-based substrates were supplied with appropriate seed layers formed thereon prior to deposition thereon of the underlayers, intermediate layers, ferromagnetic recording layers, and protective overcoat layers. Substrate temperatures during deposition processing were about 280° C. in each instance.

Magnetic properties of the sputter-deposited media, such as remanent coercivity ($H_r$), magnetic remanence-layer thickness product ($M_r t$), and remanent coercivity squareness ($S_r^*$) were measured by means of a rotating disk magnetometer. Magnetic recording performance characteristics, such as signal-to-media noise ratio (SMNR), PW 50, and overwrite (OW) were measured on a spin stand (Guzik Co, San Jose, Calif.), with a head comprised of a write element and a giant magnetoresistive (GMR) read element. 500 kfci (=thousands of flux reversals/in.) was used for the recording testing. X-ray diffraction (XRD) curves of the various films were measured in a $\theta$–$2\theta$ symmetric mode. Unless otherwise specified in the examples described below, the thicknesses of each of the seed layers, underlayers, intermediate layers, and ferromagnetic layers are within the respective ranges given supra. The thickness of the intermediate layers of the samples utilized for the XRD analysis was in the range from about 20 to about 50 Å, which is much smaller than the typical thickness of the CoCrPtB magnetic films, i.e., about 200 Å.

Figure 3A:
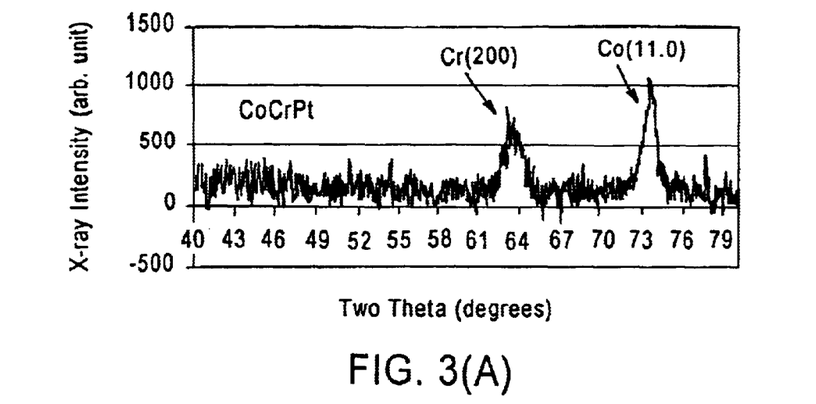
FIGS. 3(A) and 3(B) are graphs showing X-ray diffraction curves of bi-crystal glass media with CoCr, CoCrW, and CoCrPt intermediate layers.
Figure 3B:
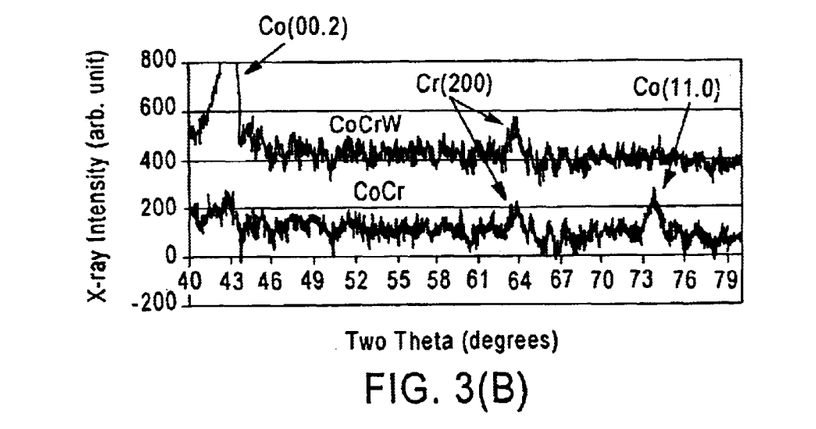

FIGS. 3(A) and 3(B) are graphs showing XRD curves of bi-crystal glass media (i.e., media with underlayer (200) and Co (11.0) orientations, where the underlayers can be Cr, NiAl, etc.) with CoCr, CoCrW, and CoCrPt intermediate layers 12C. The counting time was 0.3 sec./scan step in FIG. 3(A) and 1.8 sec./scan step in FIG. 3(B). The film structure of the media with CoCr or CoCrW intermediate layers have a film structure of $CrTi_{43}/Cr/CrW_{10}/CoCr_{37}$ or $CoCr_{37}W_5/CoCr_{16}Pt_{10}B_{10}$, and were sputter-deposited under identical conditions. The medium with the $CoCr_{37}W_5$ intermediate layer has a dominant (00.2) Co crystallographic orientation, which is undesirable. The medium with a non-magnetic CoCrPt intermediate layer according to the invention has a film structure of $Cr/NiP_{20}O_x/Cr/CrW_{10}/CoCr_{37}Pt_5/CoCr_{15}Pt_{10}B_{12}$ and exhibits very good Co (11.0) orientation of the $CoCr_{15}Pt_{10}B_{12}$ magnetic layer.

Figure 4:
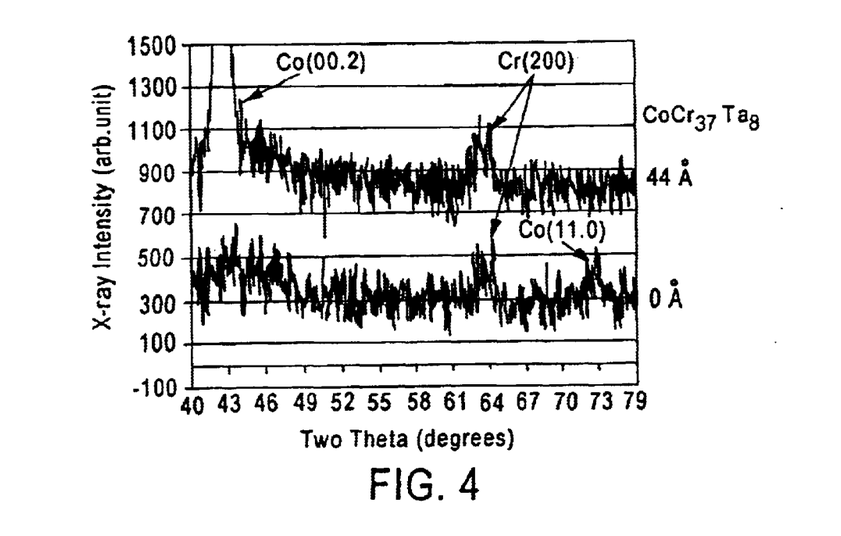
FIG. 4 is a graph showing X-ray diffraction curves of bi-crystal glass media with and without CoCrTa intermediate layers.

FIG. 4 graphically shows XRD curves of bi-crystal glass media with and without a CoCrTa intermediate layer 12C. Each type of medium was deposited under identical conditions, except for the CoCrTa layer. The resultant film structure was $Cr/NiP_{20}O_x/Cr/CrW_{10}/CoCr_{37}Ta_8/CoCr_{15}Pt_{12}B_{12}$. The medium without the $CoCr_{37}Ta_8$ intermediate layer exhibits typical bi-crystal crystallographic orientation, whereas the medium with the $CoCr_{37}Ta_8$ intermediate layer exhibits an undesirable Co (00.2) dominant crystallographic orientation.

Figure 5:
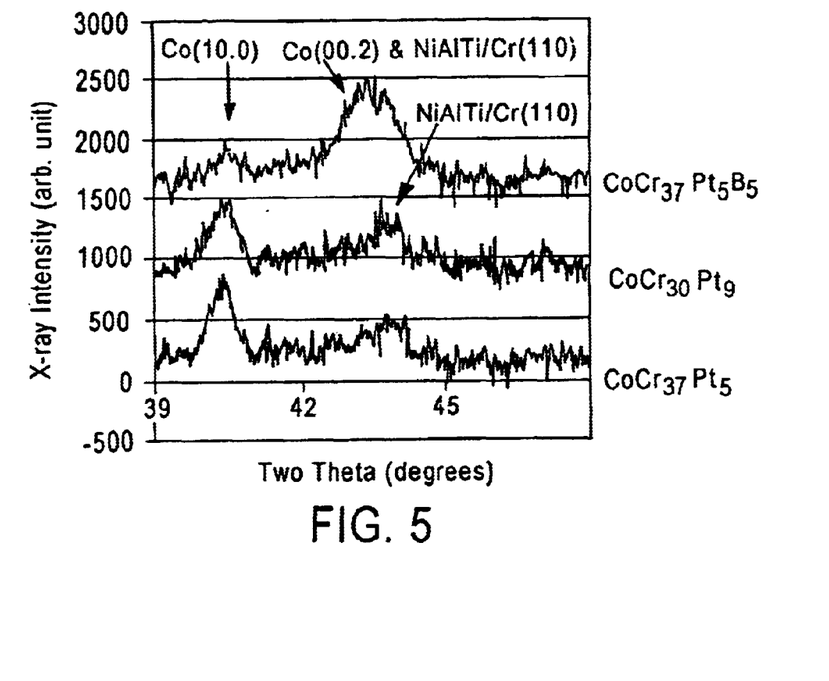
FIG. 5. is a graph showing X-ray diffraction curves of uni-crystal glass media with $CoCr_{37}Pt_5$, $CoCr_{30}Pt_9$, and $CoCr_{37}Pt_5B_5$ intermediate layers.

FIG. 5 is a graph showing XRD curves of uni-crystal glass media (i.e., media with underlayer (112) and Co (10.0) orientations, where the underlayers can be Cr, NiAl, etc.) with $CoCr_{37}Pt_5$, $CoCr_{30}Pt_9$, and $CoCr_{37}Pt_5B_5$ intermediate layers 12C, respectively. The respective film structures are:

$NiAl_{45}Ti_5/CrMo_{10}/CoCr_{30}Pt_5B_5/CoCr_{20}Pt_{10}B_6/CoCr_{12}Pt_8B_8$ (top curve), $NiAl_{45}Ti_5/CrMo_{10}/CoCr_{30}Pt_9/CoCr_{22}Pt_{12}B_6/CoCr_{12}Pt_8B_8$ (middle curve), and $NiAl_{45}Ti_5/CrMo_{10}/CoCr_{37}Pt_5/CoCr_{22}Pt_{12}B_6/CoCr_{12}Pt_8B_8$ (bottom curve).

As is evident from a comparison of the XRD curves, the desirable Co (10.0) orientation for uni-crystal media is much stronger for the media with the $CoCr_{30}Pt_9$ or $CoCr_{37}Pt_5$ non-magnetic intermediate layers than for the media with the $CoCr_{30}Pt_5B_5$ intermediate layer, and the media with the $CoCr_{30}Pt_5B_5$ intermediate layer exhibit undesirable Co (00.2) dominant crystallographic orientation.

Figure 6:
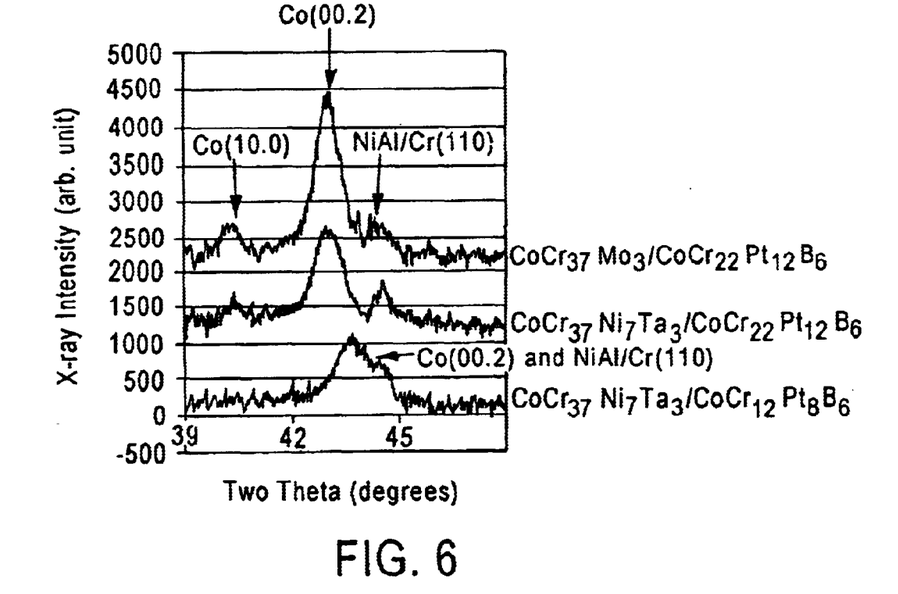
FIG. 6 is a graph showing X-ray diffraction curves of uni-crystal glass media with $CoCr_{37}Mo_3$ and $CoCr_{37}Ni_7Ta_3$ intermediate layers.

FIG. 6 is a graph showing XRD curves of uni-crystal glass media with $CoCr_{37}Mo_3$ or $CoCr_{37}Ni_7Ta_3$ intermediate layers 12C. The respective film structures are:

$NiAlO_x/NiAl_{50}/Cr/CoCr_{37}Mo_3/CoCr_{22}Pt_{12}B_6$ (top curve), $NiAlO_x/NiAl_{50}/Cr/CoCr_{37}Ni_7Ta_3/CoCr_{22}Pt_{12}B_6$ (middle curve), and $NiAlO_x/NiAl_{50}/Cr/CoCr_{37}Ni_7Ta_3/CoCr_{12}Pt_6B_8$ (bottom curve).

As indicated in FIG. 6, each of the above media with the $CoCr_{37}Mo_3$ or $CoCr_{37}Ni_7Ta_3$ intermediate layers exhibit undesirable Co (00.2) dominant crystallographic orientations.

Figure 7:
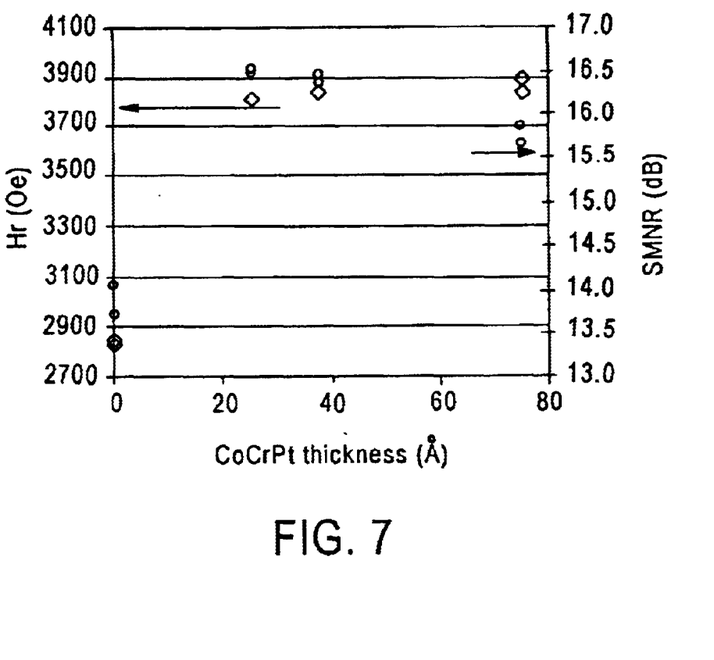
FIG. 7 is a graph showing the dependence of Hr and SMNR on $CoCr_{37}Pt_5$ intermediate layer thickness.

FIG. 7 graphically shows the dependence on $CoCr_{37}Pt_5$ intermediate layer thickness of remanent coercivity ($H_r$) and signal-to-medium noise ratio (SMNR) of media having a film or layer structure on glass substrates of $NiAl_{50}/CrMo_{10}/CoCr_{37}Pt_5/CoCr_{22}Pt_{12}B_6/CoCr_{12}Pt_8B_8$. As is evident from the figure, the media without a non-magnetic CoCrPt intermediate layer 12C, i.e., media with zero $CoCr_{37}Pt_5$ intermediate layer thickness, have much lower values of $H_r$ and SMNR than the media with the $CoCr_{37}Pt_5$ intermediate layer.

Figure 8:
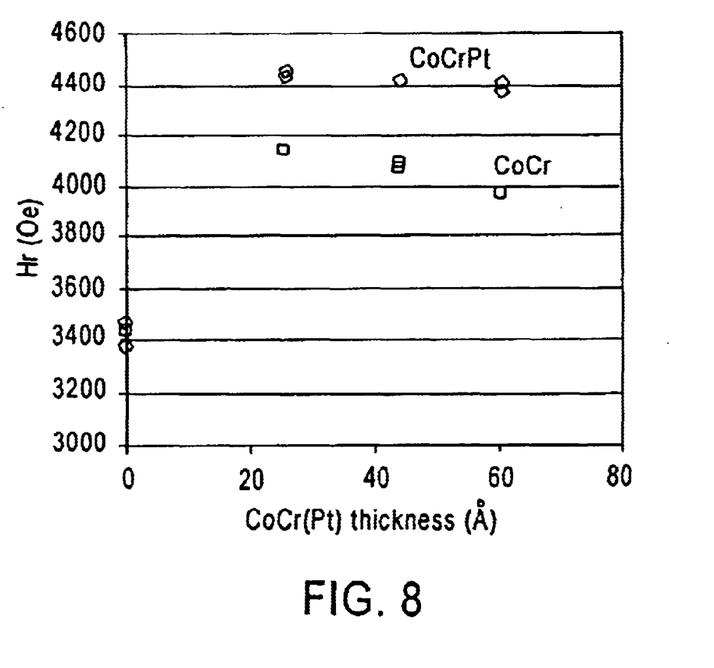
FIG. 8 is a graph showing the dependence of Hr on $CoCr_{37}$ and $CoCr_{37}Pt_5$ thickness.

FIG. 8 is a graph showing the dependence on $CoCr_{37}Pt_5$ and $CoCr_{37}$ intermediate layer thickness of remanent coercivity ($H_r$) of media having a film or layer structure on glass substrates of $Cr/NiP_{20}O_x/Cr/CrW_{10}/CoCr_{37}/CoCr_{15}Pt_{10}B_{12}$ and $Cr/NiP_{20}O_x/Cr/CrW_{10}/CoCr_{37}Pt_5/CoCr_{15}Pt_{10}B_{12}$. As before, the media without $CoCr_{37}$ or $CoCr_{37}Pt_5$ intermediate layers exhibit very low values of $H_r$. However, the media with the $CoCr_{37}Pt_5$ non-magnetic intermediate layers exhibit much higher values of $H_r$ than the media with the $CoCr_{37}$ intermediate layers.

Table I below presents a comparison of the average values of remanent coercivity squareness ($S_r^*$) of media having a film or layer structure of $NiAl_{45}Ti_5/CrMo_{10}/CoCrX/CoCr_{22}Pt_{12}B_6/CoCr_{12}Pt_8B_8$, where $CoCrX = CoCr_{37}$, $CoCr_{37}Pt_5$, $CoCr_{30}Pt_9$ intermediate layers, respectively, and no intermediate layer. The $M_r t$ values of each medium is in the range from about 0.27 to about 0.49 memu/cm². The media with the $CoCr_{37}Pt_5$ or $CoCr_{30}Pt_9$ non-magnetic intermediate layers have greater values of $S_r^*$ than the media with the $CoCr_{37}$ intermediate layers and much greater values of $S_r^*$ than the media with no intermediate layer.

TABLE I

| Intermediate Layer | $S_r$* |
|---|---|
| $CoCr_{30}Pt_9$ | 0.83 |
| $CoCr_{37}Pt_5$ | 0.81 |
| $CoCr_{37}$ | 0.79 |
| None | 0.71 |

Table II below provides a comparison of the magnetic properties of media formed on Al substrates and having film or layer structures of:

$Cr/CrW_{10}/CoCr_{37}/CoCr_{22}Pt_{12}B_6/CoCr14Pt_8B_8$ and $Cr/CrW_{10}/CoCr_{37}Pt_6/CoCr_{22}Pt_{12}B_6/CoCr_{14}Pt_8B_8$, wherein the substrate temperature was varied to obtain the desired coercivity.

TABLE II

| Intermediate Layer | $H_r$ (Oe) | $M_r t$ (memu/cm$^2$) | PW50 ($\mu$") | OW (−dB) | SMNR (dB) |
|---|---|---|---|---|---|
| $CoCr_{37}$ | 3995 | 0.385 | 3.97 | 29.82 | 17.47 |
| $CoCr_{37}Pt_6$ | 3542 | 0.303 | 3.84 | 32.86 | 18.44 |
| $CoCr_{37}Pt_6$ | 3633 | 0.303 | 3.81 | 32.08 | 18.55 |
| $CoCr_{37}Pt_6$ | 3749 | 0.304 | 3.82 | 32.30 | 18.54 |
| $CoCr_{37}Pt_6$ | 3894 | 0.367 | 3.89 | 29.87 | 18.31 |

As should be apparent from the Table, media with the non-magnetic $CoCr_{37}Pt_6$ intermediate layer according to the invention exhibit higher SMNR than similar media with CoCr intermediate layers.

In summary, magnetic media according to the invention, with CoCrPtB ferromagnetic recording layers and Cr-based or B2-structured underlayers and which include substantially non-magnetic, high Cr content CoCrPt intermediate layers beneath the CoCrPtB magnetic layer, have stronger preferred Co (11.0) or (10.0) crystallographic orientations, higher remanent coercivities (H.), remanent coercivity squareness ($S_r$*), and signal-to-noise ratios (SMNR) than similar media with CoCr intermediate layers. Such advantages are even more pronounced when the media according to the invention are compared with similar media without intermediate layers. The inventive media with non-magnetic, high Cr content CoCrPt intermediate layers can be used with glass substrates coated with a variety of different seed layers to form uni- and bi-crystal media. In addition, the inventive, non-magnetic, high Cr content CoCrPt intermediate layers are superior to other intermediate layers with a similar Cr content of about 37 at. %, such as CoCrW, CoCrTa, CoCrPtB, CoCrNiTa, and CoCrMo, in that each has a strong Co (00.2) preferred orientation, and thus are not suitable for use as intermediate layers in longitudinal media utilizing CoCrPtB magnetic layers with high Pt and high B content.

The present invention thus advantageously provides high quality, low noise, high SMNR, high areal recording density longitudinal magnetic recording media, which media achieve improved magnetic properties via reducing lattice mismatch between underlayers and ferromagnetic recording layers by means of an appropriately constituted non-magnetic intermediate layer placed immediately below the ferromagnetic recording layer. Further, the inventive methodology can be practiced in a cost-effective manner, utilizing conventional manufacturing technology and equipment (e.g., sputtering technology/equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic recording medium, comprising in overlying sequence from a surface of a non-magnetic substrate:
   at least one Cr-containing or B2-structured underlayer;
   a non-magnetic CoCrPt alloy intermediate layer containing from about 4 to about 15 at. % Pt; and
   at least one CoCrPtB ferromagnetic alloy recording layer;
   wherein said intermediate layer of non-magnetic CoCrPt alloy has a composition which facilitates Co (11.0) or (10.0) crystallographic orientation of said at least one CoCrPtB ferromagnetic alloy recording layer.

2. The magnetic recording medium as in claim 1, wherein:
   said at least one CoCrPtB ferromagnetic alloy recording layer contains at least about 5 at. % each of Pt and B and said intermediate layer of non-magnetic CoCrPt alloy has a lattice constant which reduces the effect of lattice constant mismatch between said at least one Cr-containing or B2-structured underlayer and said at least one CoCrPtB ferromagnetic alloy recording layer.

3. The magnetic recording medium as in claim 2, wherein:
   said intermediate layer of non-magnetic CoCrPt alloy has a thickness from about 10 to about 45 Å.

4. The magnetic recording medium as in claim 2, wherein: said intermediate layer of non-magnetic CoCrPt alloy contains from about 28 to about 43 at. % Cr.

5. The magnetic recording medium as in claim 4, wherein: said intermediate layer of non-magnetic CoCrPt alloy is $CoCr_{37}Pt_5$ or $CoCr_{30}Pt_9$.

6. The magnetic recording medium as in claim 1, wherein said medium is a bi-crystal or uni-crystal medium and further comprises:
   a seed layer intermediate said non-magnetic substrate and said at least one Cr-containing or B2-structured underlayer.

7. The magnetic recording medium as in claim 6, wherein: said seed layer is selected from the group consisting of $Cr/NiPO_x$, CrTi, and $NiAlO_x$.

8. The magnetic recording medium as in claim 1, wherein: said at least one Cr-containing or B2-structured underlayer is selected from the group consisting of Cr, CrW, CrMo, CrV, Cr/CrV, Cr/CrW, NiAl, NiAlTi, NiAlRu, and NiAl/CrMo.

9. A method of manufacturing a magnetic recording medium, which method comprises the sequential steps of:
   (a) providing a non-magnetic substrate having a surface;
   (b) forming at least one Cr-containing or B2-structured underlayer on said substrate surface;

(c) forming a non-magnetic CoCrPt alloy intermediate layer containing from about 4 to about 15 at. % Pt over said at least one Cr-containing or B2-structured underlayer; and (d) forming at least one CoCrPtB ferromagnetic alloy recording layer over said non-magnetic CoCrPt alloy intermediate layer;

wherein step (c) comprises forming said intermediate layer of non-magnetic CoCrPt alloy with a composition which facilitates Co (11.0) or (10.0) crystallographic orientation of said at least one CoCrPtB ferromagnetic alloy recording layer.

10. The method according to claim 9, wherein:

step (a) comprises providing a non-magnetic substrate selected from the group consisting of Al, Al—Mg alloys, other Al-based alloys, NiP-plated Al, NiP-plated Al-based alloys, glass, ceramics, glass-ceramics, polymers, and laminates or composites thereof.

11. The method according to claim 9, wherein:

step (b) comprises forming said at least one Cr-containing or B2-structured underlayer from the group consisting of Cr, CrW, CrMo, CrV, Cr/CrV, Cr/CrW, NiAl, NiAlTi, NiAlRu, and NiAl/CrMo.

12. The method according to claim 9, wherein:

step (c) comprises forming an about 10 to about 45 Å thick non-magnetic CoCrPt alloy intermediate layer containing from about 28 to about 43 at. % Cr said intermediate layer of non-magnetic CoCrPt alloy having a lattice constant which reduces the effect of lattice constant mismatch between said at least one Cr-containing or B2-structured underlayer and said at least one CoCrPtB ferromagnetic alloy recording layer.

13. The method according to claim 9, wherein:

step (d) comprises forming at least one CoCrPtB ferromagnetic alloy recording layer containing at least about 5 at. % each of Pt and B.

14. The method according to claim 9, further comprising a step of:

forming a seed layer on said non-magnetic substrate prior to performing step (b) for forming said at least one Cr-containing or B2-structured underlayer, said seed layer being selected from the group consisting of Cr/NiPO$_x$, CrTi, and NiAlO$_x$.

15. The method according to claim 9, further comprising the sequential steps of:

(e) forming a protective overcoat layer over said ferromagnetic recording layer; and (f) forming a lubricant topcoat over said protective overcoat layer.

16. The method according to claim 15, herein:

at least steps (b)–(d) comprise depositing by sputtering.

17. A magnetic recording medium, comprising:

at least one Cr-based or B2-structured underlayer and at least one CoCrPtB ferromagnetic recording layer containing at least about 5 at. % each of Pt and B; and means comprising a CoCrPt non-magnetic intermediate layer containing from about 4 to about 15 at. % Pt for facilitating Co (11.0) or (10.0) crystallographic orientation of said at least one CoCrPtB ferromagnetic alloy recording layer.

18. The magnetic recording medium according to claim 17, further comprising:

a non-magnetic substrate for supporting said underlayer, said ferromagnetic recording layer, and said means for facilitating.

19. A disk drive comprising the magnetic recording medium of claim 17.

* * * * *